(12) United States Patent
Hashimoto et al.

(10) Patent No.: US 9,133,769 B2
(45) Date of Patent: Sep. 15, 2015

(54) CONNECTION STRUCTURE OF EXHAUST CHAMBER, SUPPORT STRUCTURE OF TURBINE, AND GAS TURBINE

(71) Applicant: MITSUBISHI HITACHI POWER SYSTEMS, LTD., Nishi-ku, Yokohama (JP)

(72) Inventors: Shinya Hashimoto, Hyogo-ken (JP); Kenichi Arase, Hyogo-ken (JP)

(73) Assignee: MITSUBISHI HITACHI POWER SYSTEMS, LTD., Yokohama (JP)

( * ) Notice: Subject to any disclaimer, the term of this patent is extended or adjusted under 35 U.S.C. 154(b) by 0 days.

(21) Appl. No.: 14/322,226

(22) Filed: Jul. 2, 2014

(65) Prior Publication Data

US 2014/0311162 A1 Oct. 23, 2014

Related U.S. Application Data

(62) Division of application No. 12/919,530, filed as application No. PCT/JP2009/051280 on Jan. 27, 2009, now Pat. No. 8,800,300.

(30) Foreign Application Priority Data

Feb. 27, 2008 (JP) .................................. 2008-046699
Mar. 28, 2008 (JP) .................................. 2008-088744

(51) Int. Cl.
 *F02C 7/20* (2006.01)
 *F01D 25/30* (2006.01)
 *F01D 25/28* (2006.01)

(52) U.S. Cl.
 CPC . *F02C 7/20* (2013.01); *F01D 25/28* (2013.01); *F01D 25/30* (2013.01); *F05D 2260/941* (2013.01)

(58) Field of Classification Search
 CPC ..... F01D 25/30; F01D 25/145; F01D 11/005; F01D 9/023; F02K 1/80; F02K 1/822; F23R 3/60; F02C 7/20
 USPC ............. 60/226.2, 226.3, 770, 771, 799, 796, 60/797, 798, 800; 285/47; 239/265.11–265.43
 See application file for complete search history.

(56) References Cited

U.S. PATENT DOCUMENTS 4,050,660 A 9/1977 Eggmann et al.
4,076,452 A 2/1978 Hartmann
(Continued)

FOREIGN PATENT DOCUMENTS

CA 1180198 A 1/1985
CN 1854487 A 11/2006
(Continued)

OTHER PUBLICATIONS

Extended European Search Report issue on May 28, 2014, corresponding to European Patent Application No. 09715965.
(Continued)

*Primary Examiner* — Phutthiwat Wongwian
*Assistant Examiner* — Steven Sutherland
(74) *Attorney, Agent, or Firm* — Lowe Hauptman & Ham, LLP

(57) ABSTRACT

In a gas turbine, an exhaust casing and an exhaust chamber are connected by an exhaust chamber support that can absorb thermal expansion, and the exhaust chamber and an exhaust duct are connected by an exhaust duct support that can absorb thermal expansion. An insulator is mounted on an outer peripheral surface of the exhaust chamber, and the exhaust chamber support and the exhaust duct support are disposed outside the insulator in the form of a plurality of strips. Because the thermal stress at a connection portion of the exhaust chamber is reduced, the durability is enhanced.

5 Claims, 11 Drawing Sheets

(56) References Cited

U.S. PATENT DOCUMENTS

| | | | |
|---|---|---|---|
| 4,645,243 A | * | 2/1987 | Bucher et al. .................. 285/47 |
| 4,848,803 A | | 7/1989 | Bachmann |
| 4,907,743 A | | 3/1990 | Bouiller et al. |
| 5,104,286 A | | 4/1992 | Donlan |
| 5,203,593 A | | 4/1993 | Brandener |
| 5,271,218 A | | 12/1993 | Taylor |
| 5,378,026 A | | 1/1995 | Ninacs et al. |
| 5,398,496 A | * | 3/1995 | Taylor et al. .................. 60/796 |
| 5,417,545 A | | 5/1995 | Harrogate |
| 5,474,306 A | | 12/1995 | Bagepalli et al. |
| 5,657,998 A | | 8/1997 | Dinc et al. |
| 5,669,812 A | | 9/1997 | Schockemoehl et al. |
| 5,957,768 A | | 9/1999 | Schockemoehl et al. |
| 6,065,756 A | | 5/2000 | Eignor et al. |
| 6,279,965 B1 | | 8/2001 | Kida |
| 2006/0260292 A1 | | 11/2006 | Tanioka |

FOREIGN PATENT DOCUMENTS

| | | |
|---|---|---|
| EP | 0064936 A1 | 11/1982 |
| JP | 58-010124 A | 1/1983 |
| JP | 01-085429 U | 6/1989 |
| JP | 07-224684 A | 8/1995 |
| JP | 07-293277 A | 11/1995 |
| JP | 07293274 A | 11/1995 |
| JP | 11-350976 A | 12/1999 |
| JP | 2001-146993 A | 5/2001 |
| JP | 2001200729 A | 7/2001 |
| JP | 2002536595 A | 10/2002 |
| JP | 2003-065005 A | 3/2003 |
| JP | 2004-308502 A | 11/2004 |
| JP | 2006-104962 A | 4/2006 |
| JP | 2006-307733 A | 11/2006 |
| WO | 9416257 A1 | 7/1994 |

OTHER PUBLICATIONS

Notice of Allowance corresponding to Korean Patent Application No. 10-2010-7018756, dated Dec. 28, 2012.
Japanese Decision of Patent Grant for Application No. 2008-088744 mailed Nov. 20, 2012.
Japanese Office Action for Application No. 2008-088744 mailed Mar. 21, 2012.
Office Action corresponding to JP 2008-046699,dated Feb. 7, 2012.
ISR corresponding to International Application No. PCT/JP2009/051280, mailed on Apr. 7, 2009.
Office Action dated Jun. 12, 2014, corresponds to Chinese patent application No. 201310403450.0.
Notification to Grant Patent Right mailed Nov. 6, 2014, corresponding to Chinese patent application No. 200980106877.6.
Notice of Allowance issued Feb. 18, 2015, corresponding to European patent application No. 09715965.1.
Extended European Search Report issued Mar. 24, 2015, corresponding to European patent application No. 14192983.6.

* cited by examiner

CONNECTION STRUCTURE OF EXHAUST CHAMBER, SUPPORT STRUCTURE OF TURBINE, AND GAS TURBINE

RELATED APPLICATIONS

The present application is a divisional of U.S. patent application Ser. No. 12/919,530 filed on Aug. 26, 2010, which is based on International Application Number PCT/JP2009/051280, filed on Jan. 27, 2009, and claims priority from Japanese Application Numbers 2008-046699, filed on Feb. 27, 2008 and 2008-088744, filed on Mar. 28, 2008. The contents of all of the above-listed applications are incorporated by reference herein in their entirety.

TECHNICAL FIELD

The present invention, for example, in a gas turbine that obtains rotational power by supplying fuel to high-temperature and high-pressure compressed air, burning the compressed air and fuel, and supplying the produced combustion gas to a turbine, relates to a connection structure of an exhaust chamber disposed at a rear of the turbine, and a gas turbine to which the connection structure of the exhaust chamber is applied.

The present invention, for example, in a gas turbine that obtains rotational power by supplying fuel to high-temperature and high-pressure compressed air, burning the compressed air and fuel, and supplying the produced combustion gas to a turbine, also relates to a support structure of a turbine for mounting the turbine on the floor, and a gas turbine to which the support structure of the turbine is applied.

BACKGROUND ART

A gas turbine includes a compressor, a combustor, and a turbine. Air taken in from an air inlet port is turned into high-temperature and high-pressure compressed air, by being compressed by the compressor. In the combustor, fuel is supplied to the compressed air to be combusted. The high-temperature and high-pressure combustion gas drives the turbine, and drives a generator connected to the turbine. In this case, the turbine includes a casing in which a plurality of nozzles and rotor blades are alternately arranged. An output shaft connected to the generator is rotatably driven because the rotor blades are driven by the combustion gas. The combustion gas that drove the turbine is converted into static pressure by a diffuser in an exhaust casing and then released to the atmosphere.

In recent years, higher power and higher efficiency are demanded for the gas turbines formed in this manner, and the temperature of combustion gas guided to the nozzles and rotor blades has been increased. Accordingly, in general, a cooling passage is formed inside the nozzles and rotor blades, and the nozzles and rotor blades are cooled by running coolant medium such as air and steam through the cooling passage. Consequently, while maintaining the heat resistance, the temperature of combustion gas is increased, thereby increasing the power and efficiency of the gas turbine.

For example, in the turbine, an exhaust chamber is connected to the downstream of the exhaust casing in which the nozzles and rotor blades are stored, and an exhaust duct is connected to the downstream of the exhaust chamber. The exhaust casing and the exhaust chamber are connected by a thermal expansion absorbing member in the form of a cylindrical sheet, and the exhaust chamber and the exhaust duct are connected by an expansion joint having an insulator. Accordingly, the thermal stresses between the exhaust casing, the exhaust chamber, and the exhaust duct are absorbed, during heavy load operation and a power increase of the gas turbine.

For example, Patent Documents 1, 2, and 3 below disclose this connection structure of a turbine.

A gas turbine includes a compressor, a combustor, and a turbine. Air taken in from an air inlet port is turned into high-temperature and high-pressure compressed air, by being compressed by the compressor. In the combustor, fuel is supplied to the compressed air to be combusted. The high-temperature and high-pressure combustion gas drives the turbine, and drives a generator connected to the turbine. In this case, the turbine includes a casing in which a plurality of nozzles and rotor blades are alternately arranged. An output shaft connected to the generator is rotatably driven because the rotor blades are driven by the combustion gas. The combustion gas that drove the turbine is converted into static pressure by a diffuser in an exhaust casing and then released to the atmosphere.

In the gas turbine formed in this manner, the exhaust casing in which the nozzles and rotor blades are stored, the exhaust chamber, and the exhaust duct formed in cylindrical shapes are connected, and mounted on the floor in a building by a plurality of legs. The exhaust casing, the exhaust chamber, and the exhaust duct have a double cylindrical shape, because the outer casing and the inner casing are connected by a strut, and a space between the outer casing and the inner casing is a passage for exhaust gas. The legs are connected to both sides of the outer casing, and the exhaust casing, the exhaust chamber, and the exhaust duct are mounted on the floor by the legs.

For example, Patent Document 4 discloses this support structure of a turbine.

[Patent Document 1] Japanese Patent Application Laid-open No. 2006-307733
[Patent Document 2] Japanese Patent Application Laid-open No. 2004-308502
[Patent Document 3] Japanese Utility Model Application Laid-open No. H01-085429
[Patent Document 4] Japanese Patent Application Laid-open No. H07-293277

DISCLOSURE OF INVENTION

Problem to be Solved by the Invention

In the conventional gas turbine described above, the thermal stress between the members are absorbed by connecting the exhaust casing and the exhaust chamber by a thermal expansion absorbing member in a sheet shape or by connecting the exhaust chamber and the exhaust duct by an expansion joint. However, the temperature of the combustion gas has been further increased, because higher power and higher efficiency are demanded for the gas turbine, thereby making it difficult to select the thermal expansion absorbing member and to ensure the heat resistance of the expansion joint. Accordingly, the thermal expansion absorbing member and the expansion joint may be cooled. However, this leads to the increased temperature difference between the thermal expansion absorbing member and the expansion joint, and the exhaust casing, the exhaust chamber, and the exhaust duct, thereby increasing the thermal stress and adversely affecting the durability.

In the conventional support structure of the turbine described above, the legs are connected to both sides of the outer casing of the exhaust casing, the exhaust chamber, and the exhaust duct. The exhaust casing, the exhaust chamber, and the exhaust duct are mounted on the floor by the legs.

Because the exhaust casing, the exhaust chamber, and the exhaust duct are heavy goods, the bending stress is applied to fixing portions of the legs at the outer casing, thereby causing deformation or the like to them. Accordingly, a rib is provided at the outer peripheral surface of the outer casing in the circumferential direction, and the legs are connected interposing the rib therebetween.

However, during the turbine is in operation, the thermal expansion occurs because the temperature of the outer casing of the exhaust casing, the exhaust chamber, and the exhaust duct is increased by the exhaust gas. If this occurs, the thermal expansion amounts at the outer casing, between a portion where the strength is increased by the rib and the other portion differ, thereby generating thermal stress. Accordingly, the deformation, the breakage, and the like may occur.

The present invention has been made to solve the problems above, and an object of the present invention is to provide a connection structure of an exhaust chamber and a gas turbine for enhancing durability, by reducing the thermal stress at a connection portion of the exhaust chamber.

The present invention has been made in view to solve the above problems, and an object of the present invention is to provide a support structure of a turbine and a gas turbine for enhancing durability, by reducing the bending stress and the thermal stress applied to a turbine main body.

Means for Solving Problem

According to an aspect of the present invention, a connection structure of an exhaust chamber in which an exhaust chamber formed in a cylindrical shape and a connection member formed in a cylindrical shape disposed upstream or downstream of the exhaust chamber in a flowing direction of exhaust gas are connected by a support member that is capable of absorbing thermal expansion, includes: an insulator mounted on an outer peripheral surface of the exhaust chamber. The support member is disposed outside the insulator in a form of a plurality of strips, and one end thereof is connected to an end of the exhaust chamber and another end is connected to an end of the connection member.

Advantageously, in the connection structure of the exhaust chamber, the connection member is an exhaust casing disposed upstream of the exhaust chamber in the flowing direction of the exhaust gas, the insulator is mounted on an outer peripheral surface of the exhaust casing, and the exhaust casing is connected to the exhaust chamber by an exhaust chamber support as the support member.

Advantageously, the connection structure of the exhaust chamber further includes an exhaust diffuser formed in a cylindrical shape disposed inside the exhaust casing. The exhaust casing and the exhaust diffuser are connected by a diffuser support that is capable of absorbing thermal expansion in a form of a plurality of strips.

Advantageously, the connection structure of the exhaust chamber further includes a gas seal for connecting the exhaust chamber and the exhaust casing at an inside of the exhaust chamber support.

Advantageously, in the connection structure of the exhaust chamber, the connection member is an exhaust duct disposed downstream of the exhaust chamber in the flowing direction of the exhaust gas, the insulator is mounted on an inner peripheral surface of the exhaust duct, and the exhaust duct is connected to the exhaust chamber by an exhaust duct support as the support member.

Advantageously, the connection structure of the exhaust chamber further includes an outer shell member formed in a ring shape disposed at an outer peripheral side of the exhaust chamber. The exhaust duct is disposed adjacent to the outer shell member, the exhaust chamber and the outer shell member are connected by the exhaust duct support, and the outer shell member and the exhaust duct are connected by a high-temperature expansion joint.

Advantageously, the connection structure of the exhaust chamber further includes a gas seal that connects the exhaust chamber and the exhaust duct at an outside of the exhaust duct support.

According to another aspect of the present invention, a gas turbine that obtains rotational power by supplying fuel to compressed air compressed by a compressor, burning the fuel in a combustor, and supplying produced combustion gas to a turbine, the turbine including an exhaust casing and an exhaust chamber connected by an exhaust chamber support that is capable of absorbing thermal expansion, and the exhaust chamber and an exhaust duct being connected by an exhaust duct support that is capable of absorbing thermal expansion, includes: an insulator provided at an outer peripheral surface of the exhaust chamber. The exhaust chamber support is disposed outside the insulator in a form of a plurality of strips, and one end thereof is connected to an end of the exhaust chamber, and another end is connected to an end of the exhaust casing.

According to still another aspect of the present invention, a gas turbine that obtains rotational power by supplying fuel to compressed air compressed by a compressor, burning the fuel in a combustor, and supplying produced combustion gas to a turbine, the turbine including an exhaust casing and an exhaust chamber connected by an exhaust chamber support that is capable of absorbing thermal expansion, and the exhaust chamber and an exhaust duct being connected by an exhaust duct support that is capable of absorbing thermal expansion, includes an insulator provided at an outer peripheral surface of the exhaust chamber. The exhaust duct support is disposed outside the insulator in a form of a plurality of strips, and one end thereof is connected to an end of the exhaust chamber, and another end is connected to an end of the exhaust duct.

Advantageously, the gas turbine further includes an outer shell member formed in a ring shape disposed at an outer peripheral side of the exhaust chamber. The exhaust duct is disposed adjacent to the outer shell member, the exhaust chamber and the outer shell member are connected by the exhaust duct support, and the outer shell member and the exhaust duct are connected by a high-temperature expansion joint.

According to still another aspect of the present invention, a support structure of a turbine in which a turbine main body formed in a cylindrical shape and an outer shell member formed in a ring shape disposed at an outer peripheral side of the turbine main body are connected by a support member that is capable of absorbing thermal expansion, the support structure of the turbine comprising a leg for mounting the turbine main body connected to the outer shell member.

Advantageously, in the support structure of the turbine, the turbine main body includes an exhaust chamber through which combustion gas flows, the exhaust chamber and the outer shell member are connected by the support member, and the outer shell member is connected to an exhaust duct.

Advantageously, the support structure of the turbine further includes a high-temperature expansion joint interposed between the outer shell member and the exhaust duct.

Advantageously, in the support structure of the turbine, the support member is in a form of a plurality of strips, and one end thereof is connected to an end of the exhaust chamber, and another end is connected to an end of the outer shell member.

Advantageously, the support structure of the turbine further includes a gas seal that connects the exhaust chamber and the outer shell member at an outside of the support member.

Advantageously, in the support structure of the turbine, the support member is formed in a truncated cone shape, and one end thereof in an axial direction is connected to an end of the exhaust chamber, and another end is connected to an end of the outer shell member.

According to still another aspect of the present invention, a gas turbine that obtains rotational power by supplying fuel to compressed air compressed by a compressor, burning the fuel in a combustor, and supplying produced combustion gas to a turbine, the turbine including an exhaust chamber and an outer shell member formed in a ring shape disposed at an outer peripheral side of the exhaust chamber connected by a support member that is capable of absorbing thermal expansion. The gas turbine includes: an exhaust duct connected to the outer shell member; and a leg for mounting the exhaust chamber connected to the outer shell member.

Means for Solving Problem

Effect of the Invention

In the connection structure of the exhaust chamber according to the first aspect, the exhaust chamber and the connection member disposed upstream or downstream in the flowing direction of the exhaust gas are connected by the support member that can absorb thermal expansion. The insulator is mounted on the outer peripheral surface of the exhaust chamber. The support member is disposed outside the insulator in the form of a plurality of strips, and one end thereof is connected to the end of the exhaust chamber, and the other end is connected to the end of the connection member. Because the support members are formed in strips, the thermal expansion that occurs between the exhaust chamber and the connection member can be absorbed effectively. Because the support member is disposed outside the insulator, the support member is sufficiently cooled. As a result, the thermal stress at the connection portion of the exhaust chamber is reduced, thereby enhancing the durability.

In the connection structure of the exhaust chamber according to the second aspect, the connection member is the exhaust casing disposed upstream of the exhaust chamber in the flowing direction of the exhaust gas, the insulator is mounted on the outer peripheral surface of the exhaust casing, and the exhaust casing is connected to the exhaust chamber by the exhaust chamber support as the support member. Accordingly, the thermal expansion that occurs due to the temperature difference between the exhaust chamber and the exhaust casing can be effectively absorbed, thereby enhancing the durability.

In the connection structure of the exhaust chamber according to the third aspect, the exhaust diffuser formed in a cylindrical shape is disposed inside the exhaust casing, and the exhaust casing and the exhaust diffuser are connected by the diffuser support that can absorb thermal expansion in the form of a plurality of strips. Accordingly, the thermal expansion that occurs due to the temperature difference between the exhaust casing and the exhaust diffuser can be effectively absorbed, thereby enhancing the durability.

In the connection structure of the exhaust chamber according to the fourth aspect, the gas seal for connecting the exhaust chamber and the exhaust casing is provided inside the exhaust chamber support. Accordingly, it is possible to prevent the exhaust gas from leaking from the connection portion between the exhaust chamber and the exhaust casing.

In the connection structure of the exhaust chamber according to the fifth aspect, the connection member is the exhaust duct disposed downstream of the exhaust chamber in the flowing direction of the exhaust gas, the insulator is mounted on the inner peripheral surface of the exhaust duct, and the exhaust duct is connected to the exhaust chamber by the exhaust duct support as the support member. Accordingly, the thermal expansion that occurs due to the temperature difference between the exhaust chamber and the exhaust duct can be effectively absorbed, thereby enhancing the durability.

In the connection structure of the exhaust chamber according to the sixth aspect, the outer shell member formed in a ring shape is disposed at the outer peripheral side of the exhaust chamber, the exhaust duct is disposed adjacent to the outer shell member, the exhaust chamber and the outer shell member are connected by the exhaust duct support, and the outer shell member and the exhaust duct are connected by the high-temperature expansion joint. Accordingly, the high-temperature expansion joint can be suitably cooled, thereby enhancing the durability.

In the connection structure of the exhaust chamber according to the seventh aspect, the gas seal for connecting the exhaust chamber and the exhaust duct is provided outside the exhaust duct support. Accordingly, it is possible to prevent the exhaust gas from leaking from the connection portion between the exhaust chamber and the exhaust duct.

The gas turbine according to the eighth aspect includes the compressor, the combustor, and the turbine. The exhaust casing of the turbine and the exhaust chamber are connected by the exhaust chamber support that can absorb thermal expansion, and the exhaust chamber and the exhaust duct are connected by the exhaust duct support that can absorb thermal expansion. The insulator is mounted on the outer peripheral surface of the exhaust chamber. The exhaust chamber support is disposed outside the insulator in the form of a plurality of strips, and one end thereof is connected to the end of the exhaust chamber and the other end is connected to the end of the exhaust casing. Accordingly, because the exhaust chamber supports are formed in strips, the thermal expansion that occurs between the exhaust casing and the exhaust chamber can be effectively absorbed, and because the exhaust duct support is disposed outside the insulator, the exhaust duct support is sufficiently cooled. Consequently, the thermal stress at the connection portion of the exhaust chamber is reduced, thereby enhancing the durability. As a result, the power and efficiency of the turbine can be enhanced.

The gas turbine according to the ninth aspect includes the compressor, the combustor, and the turbine. The exhaust casing of the turbine and the exhaust chamber are connected by the exhaust chamber support that can absorb thermal expansion, the exhaust chamber and the exhaust duct are connected by the exhaust duct support that can absorb thermal expansion, and the insulator is mounted on the outer peripheral surface of the exhaust chamber. The exhaust duct support is disposed outside the insulator in the form of a plurality of strips, and one end thereof is connected to the end of the exhaust chamber and the other end is connected to the end of the exhaust duct. Accordingly, because the exhaust duct supports are formed in strips, the thermal expansion that occurs between the exhaust chamber and the exhaust duct can be effectively absorbed. Because the exhaust duct support is disposed outside the insulator, this exhaust duct support is sufficiently cooled. Consequently, the thermal stress at the connection portion of the exhaust chamber is reduced, thereby enhancing the durability. As a result, the power and efficiency of the turbine can be enhanced.

In the gas turbine according to the tenth aspect, the outer shell member formed in a ring shape is disposed at the outer peripheral side of the exhaust chamber, the exhaust duct is disposed adjacent to the outer shell member, the exhaust chamber and the outer shell member are connected by the exhaust duct support, and the outer shell member and the exhaust duct are connected by the high-temperature expansion joint. Accordingly, the high-temperature expansion joint can be suitably cooled, thereby enhancing the durability.

In the support structure of the turbine according to the eleventh aspect, the turbine main body formed in a cylindrical shape and the outer shell member formed in a ring shape disposed at the outer peripheral side of the turbine main body are connected by the support member that can absorb thermal expansion, and the legs for mounting the turbine main body are connected to the outer shell member. Accordingly, because the outer shell member and the support member have high rigidities, the bending stress due to the weight of the turbine main body can be sufficiently supported, and the thermal expansion of the turbine main body can be absorbed by the support member. Consequently, the bending stress and the thermal stress applied to the turbine main body are reduced, thereby enhancing the durability.

In the support structure of the turbine according to the twelfth aspect, the exhaust chamber through which combustion gas flows is provided as the turbine main body. The exhaust chamber and the outer shell member are connected by the support member, and the exhaust duct is connected to the outer shell member. Accordingly, because the outer shell member and the support member have high rigidities, the bending stress due to the weight of the exhaust chamber can be sufficiently supported, and the support member can absorb the thermal expansion of the exhaust chamber and the exhaust duct.

In the support structure of the turbine according to the thirteenth aspect, the high-temperature expansion joint is interposed between the outer shell member and the exhaust duct. Accordingly, the thermal expansion between the exhaust chamber and the exhaust duct can be effectively absorbed by the high-temperature expansion joint, thereby enhancing the durability.

In the support structure of the turbine according to the fourteenth aspect, the support member is formed in a plurality of strips, and one end thereof is connected to the end of the exhaust chamber and the other end is connected to the end of the outer shell member. Being formed into strips, the support members have high rigidities, thereby suitably supporting the bending stress due to the weight of the exhaust chamber.

In the support structure of the turbine according to the fifteenth aspect, the gas seal for connecting the exhaust chamber and the outer shell member are provided outside the support member. Accordingly, it is possible to prevent the exhaust gas from leaking from the connection portion between the exhaust chamber and the exhaust duct.

In the support structure of the turbine according to the sixteenth aspect, the support member is formed in a truncated cone shape, and one end thereof in the axial direction is connected to the end of the exhaust chamber, and the other end is connected to the end of the outer shell member. Being formed into a truncated cone shape, the support member has a high rigidity, thereby suitably supporting the bending stress due to the weight of the exhaust chamber.

The gas turbine according to the seventeenth aspect includes the compressor, the combustor, and the turbine. The exhaust chamber of the turbine and the outer shell member formed in a ring shape disposed at the outer peripheral side of the exhaust chamber are connected by the support member that can absorb thermal expansion. The outer shell member and the exhaust duct are connected, and the legs for mounting the exhaust chamber are connected to the outer shell member. Accordingly, because the outer shell member and the support member have high rigidities, the bending stress due to the weight of the turbine main body can be sufficiently supported, and the thermal expansion of the turbine main body can be absorbed by the support member. Consequently, the bending stress and the thermal stress applied to the turbine main body are reduced, thereby enhancing the durability.

Figure 1:
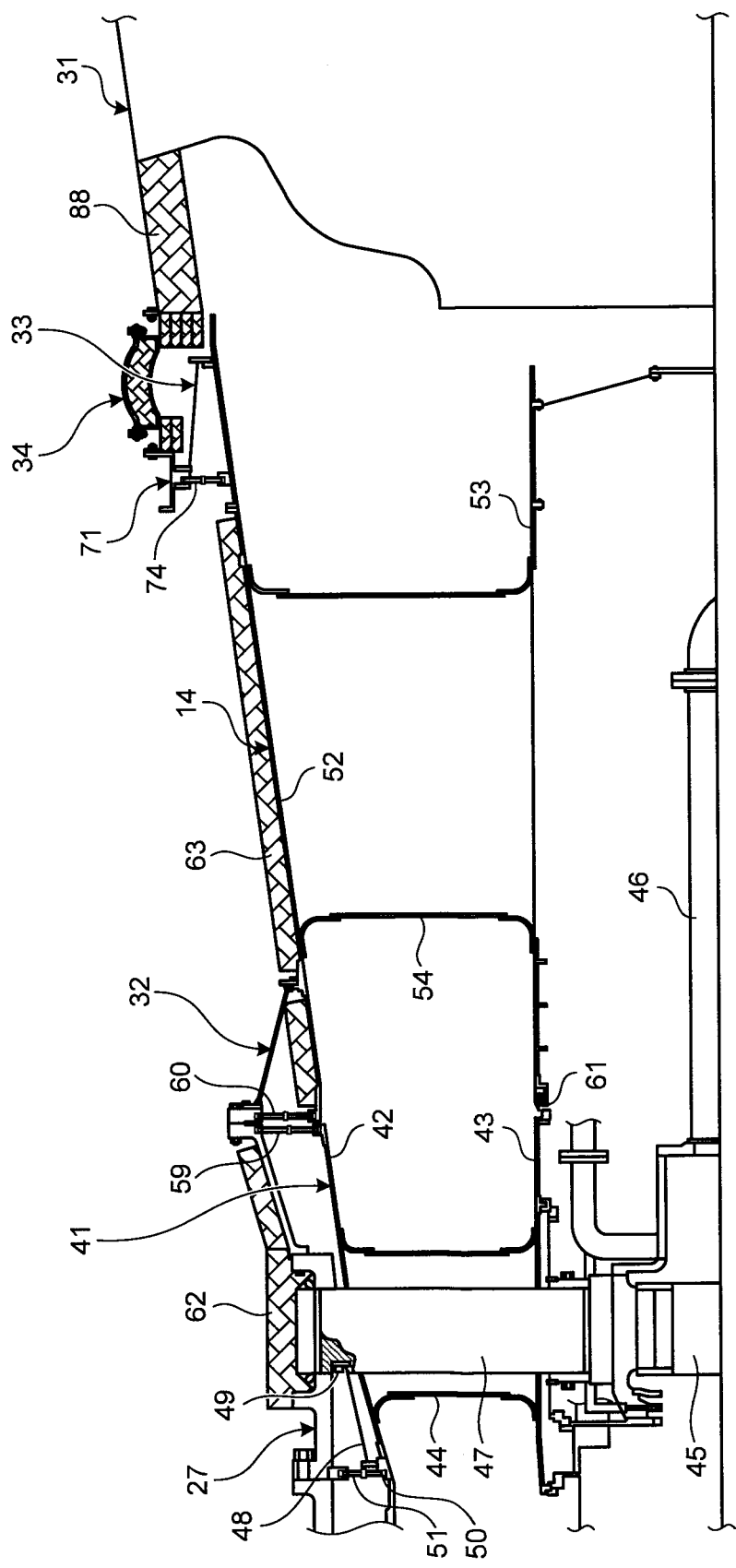
FIG. 1 is a sectional view of an essential portion of a turbine illustrating a connection structure of an exhaust chamber in a gas turbine according to a first embodiment of the present invention.

EXPLANATIONS OF LETTERS OR NUMERALS 11 compressor
12 combustor
13 turbine
14, 101 exhaust chamber (turbine main body)
20 turbine casing
23, 41 exhaust diffuser
27 exhaust casing (connection member, turbine main body)
31 exhaust duct (connection member, turbine main body)
32 exhaust chamber support (support member)
33, 103 exhaust duct support (support member)
34, 105 expansion joint (high-temperature expansion joint)
41 exhaust diffuser
48 diffuser support
51, 59, 60, 74 gas seal
62, 63, 80, 86, 87, 88 insulator
71, 102 outer shell member
92 exhaust chamber leg

BEST MODE(S) FOR CARRYING OUT THE INVENTION

Exemplary embodiments of a connection structure of an exhaust chamber, a support structure of a turbine, and a gas turbine according to the present invention are described below in detail with reference to the accompanying drawings. However, the present invention is not limited by the embodiments.

First Embodiment

Figure 2:
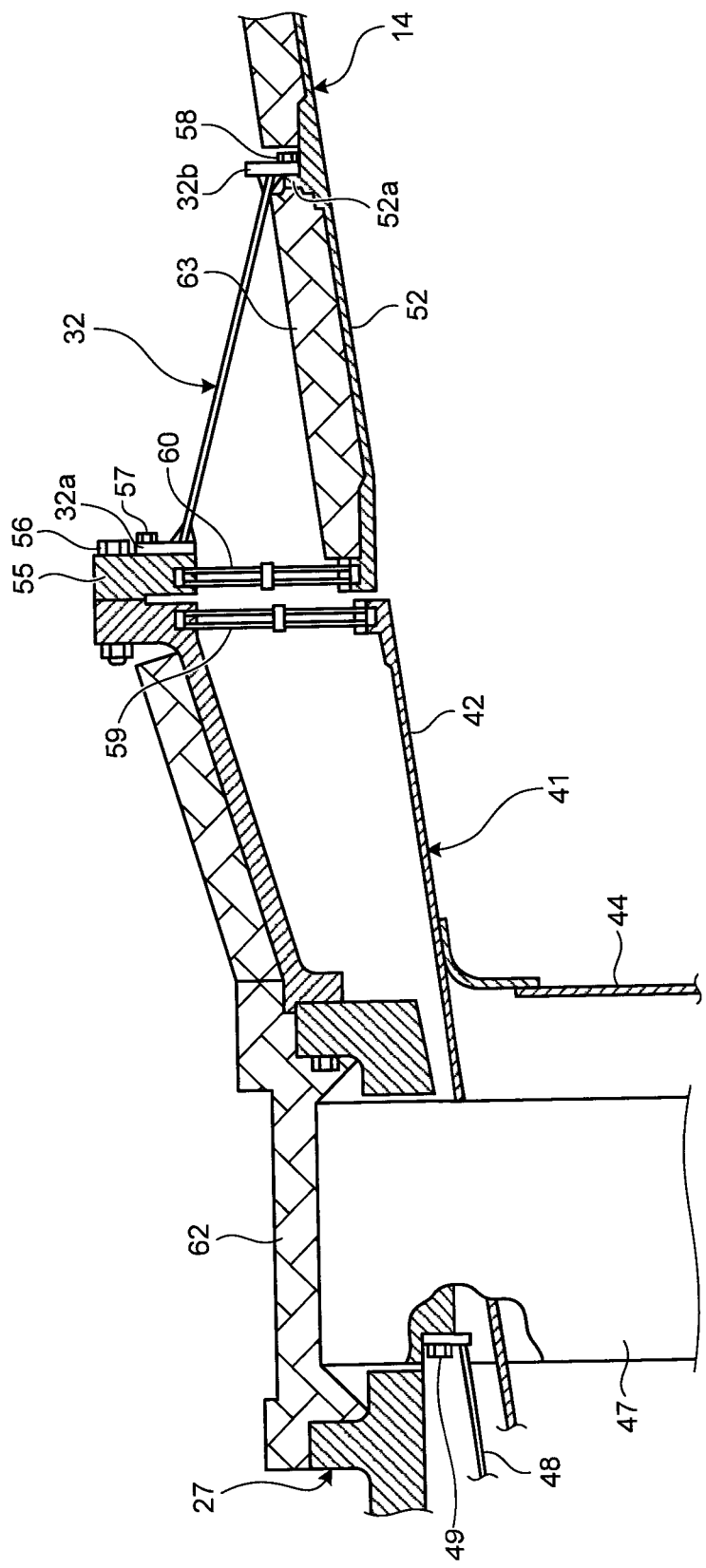
FIG. 2 is a sectional view of a connection portion between an exhaust casing and the exhaust chamber in the gas turbine of the first embodiment.
Figure 3:
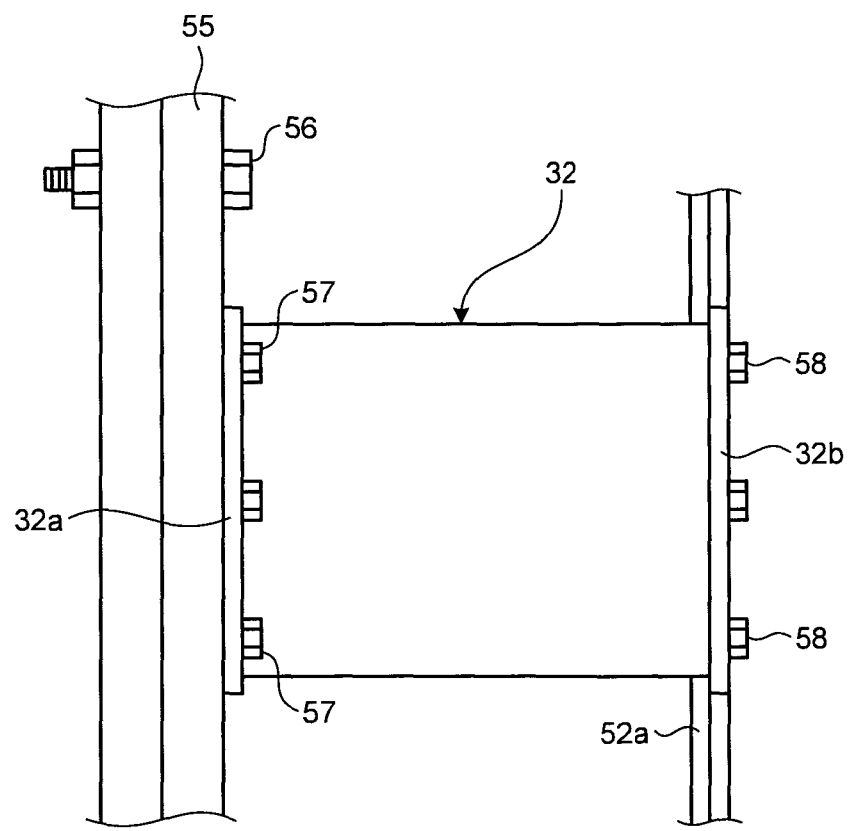
FIG. 3 is a plan view of the connection portion between the exhaust casing and the exhaust chamber.
Figure 4:
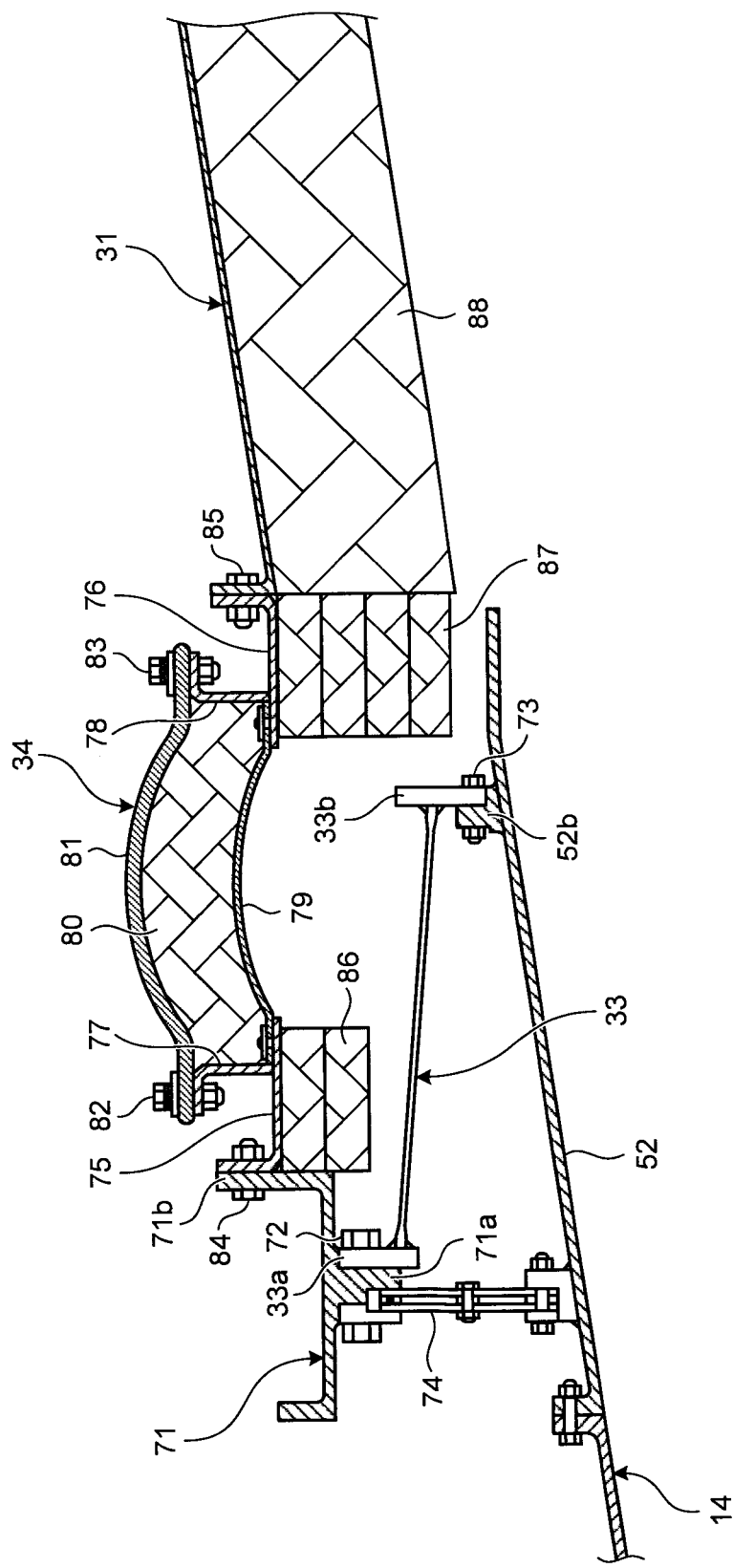
FIG. 4 is a sectional view of a connection portion between the exhaust chamber and an exhaust duct in the gas turbine of the first embodiment.
Figure 5:
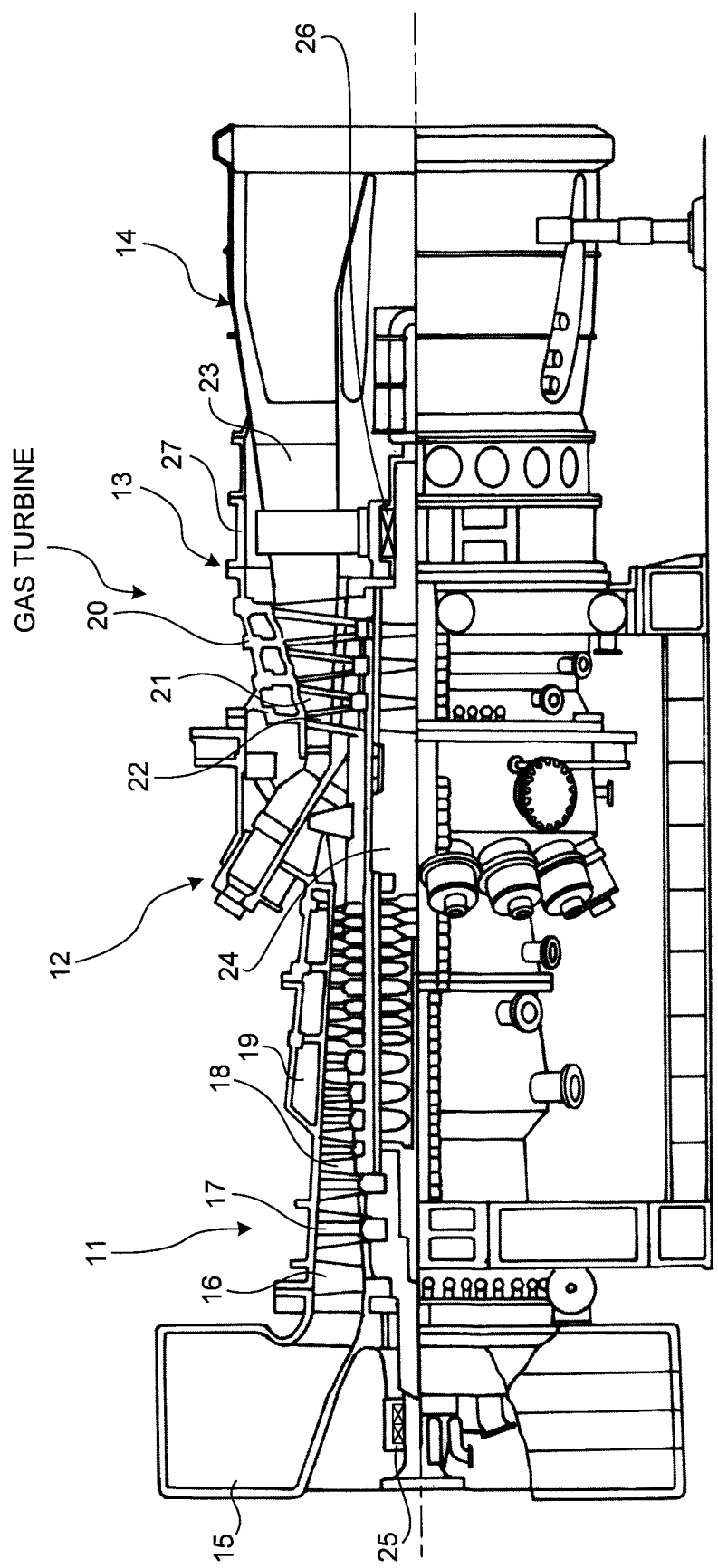
FIG. 5 is a schematic of the gas turbine of the first embodiment.

FIG. 1 is a sectional view of an essential portion of a turbine illustrating a connection structure of an exhaust chamber in a gas turbine according to a first embodiment of the present invention. FIG. 2 is a sectional view of a connection portion between an exhaust casing and the exhaust chamber in the gas turbine of the first embodiment. FIG. 3 is a plan view of the connection portion between the exhaust casing and the exhaust chamber. FIG. 4 is a sectional view of a connection portion between the exhaust chamber and an exhaust duct in the gas turbine of the first embodiment. FIG. 5 is a schematic of the gas turbine of the first embodiment.

The gas turbine of the present embodiment, as shown in FIG. 5, includes a compressor 11, a combustor 12, a turbine 13, and an exhaust chamber 14. A generator, which is not shown, is connected to this gas turbine 13. This compressor 11 includes an air inlet port 15 for taking in air, a compressor casing 16 in which a plurality of nozzles 17 and rotor blades 18 are alternately arranged, and a bleed air manifold 19 provided at the outside. The combustor 12 supplies fuel to compressed air compressed by the compressor 11, and the compressed air and fuel are burned by being ignited by a burner. The turbine 13 includes a turbine casing 20 in which a plurality of nozzles 21 and rotor blades 22 are alternately arranged. The exhaust chamber 14 is disposed downstream of the turbine casing 20 interposing an exhaust casing 27 therebetween. The exhaust chamber 14 includes an exhaust diffuser 23 continued to the turbine 13. A rotor (turbine shaft) 24 is placed so as to penetrate through the center portions of the compressor 11, the combustor 12, the turbine 13, and the exhaust chamber 14. The end of the rotor 24 at the side of the compressor 11 is rotatably supported by a bearing portion 25, and the other end of the rotor 24 at the side of the exhaust chamber 14 is rotatably supported by a bearing portion 26. The rotor 24 is formed of a plurality of disks on which rotor blades 18 and 22 are placed, and a driving shaft of the generator, which is not shown, is connected to the end at the side of the exhaust chamber 14.

Accordingly, the air taken in from the air inlet port 15 of the compressor 11 is turned into high-temperature and high-pressure compressed air, by passing through the nozzles 21 and the rotor blades 22, and being compressed. In the combustor 12, a predetermined fuel is supplied to the compressed air to be combusted. The high-temperature and high-pressure combustion gas that is working fluid produced in the combustor 12 passes through the nozzles 21 and the rotor blades 22 of the turbine 13, thereby rotatably driving the rotor 24 and driving the generator connected to the rotor 24. The exhaust gas is converted into static pressure by the exhaust diffuser 23 in the exhaust chamber 14 and then released to the atmosphere.

In the turbine 13 described above, as shown in FIG. 1, the exhaust casing 27 is placed downstream of the turbine casing 20 in which the nozzles 21 and the rotor blades 22 are alternately arranged. The exhaust casing 27 is formed in a cylindrical shape. The exhaust chamber 14 is disposed downstream of the exhaust casing 27 in the flowing direction of the exhaust gas. The exhaust chamber 14 is formed in a cylindrical shape. An exhaust duct 31 is disposed downstream of the exhaust chamber 14 in the flowing direction of the exhaust gas. The exhaust duct 31 is formed in a cylindrical shape. The exhaust casing 27 and the exhaust chamber 14 are connected by an exhaust chamber support (support member) 32 that can absorb thermal expansion. The exhaust chamber 14 and the exhaust duct 31 are connected by an exhaust duct support (support member) 33 that can absorb thermal expansion and an expansion joint (high-temperature expansion joint) 34 that can absorb thermal expansion.

An exhaust diffuser 41 formed in a cylindrical shape is disposed inside the exhaust casing 27. The exhaust diffuser 41 includes an outer diffuser 42 and an inner diffuser 43 formed in cylindrical shapes connected by a strut shield 44. The strut shield 44 has a hollow structure such as a cylindrical shape or an elliptic cylindrical shape, and is provided in plurality at equal intervals in the circumferential direction of the exhaust diffuser 41. At the inner periphery of the inner diffuser 43, the rotor 24 is rotatably supported through a bearing 45, and an oil pipe 46 for supplying lubricating oil to the bearing 45 is disposed. A strut 47 is disposed in each of the strut shields 44. Cool air is supplied from outside to a space inside the exhaust diffuser 41, and a space between the exhaust casing 27 and the exhaust diffuser 41, through the space inside the strut shield 44. A diffuser support 48, which will be described later, is also cooled by this cool air. One of the ends of the strut 47 is fixed to the exhaust casing 27, and the other end is fixed to a bearing box.

The exhaust casing 27 and the exhaust diffuser 41 are connected by the diffuser support 48. The diffuser support 48 extends in the axial direction of the turbine 13 in the form of a strip, and a plurality thereof is arranged side by side at predetermined intervals in the circumferential direction. If thermal expansion occurs due to the temperature difference between the exhaust casing 27 and the exhaust diffuser 41, each of the diffuser supports 48 absorbs the thermal expansion by deforming its shape. In particular, the thermal expansion tends to occur during a transition period such as at the start of the turbine 13. One of the ends of the diffuser support 48 is fastened to the exhaust casing 27 by a bolt 49, and the other end is fastened to the outer diffuser 42 by a bolt 50. The exhaust casing 27 is provided so as to cover the diffuser supports 48 from outside. A gas seal 51 is provided between the outer diffuser 42 and the exhaust casing 27, thereby shielding the exhaust casing from the turbine casing.

The exhaust chamber 14 includes an outer casing 52 and an inner cylinder 53 formed in cylindrical shapes connected by a follow strut 54. The follow strut 54 has a hollow structure such as a cylindrical shape or an elliptic cylindrical shape, and is provided in plurality at equal intervals in the circumferential direction of the exhaust chamber 14. Each of the follow struts 54 is opened at the side of the outer casing 52 of the exhaust chamber 14, and the inside of the follow strut 54 communicates with the atmosphere.

The exhaust casing 27 and the exhaust chamber 14 are connected by the exhaust chamber support 32. In the exhaust diffuser 41 and the exhaust chamber 14, the ends of the outer diffuser 42 and the outer casing 52, and the inner diffuser 43 and the inner cylinder 53 are closely facing each other. The diameters of the outer diffuser 42 and the outer casing 52 are enlarged toward the downstream in the flowing direction of the exhaust gas. However, the diameters of the inner diffuser 43 and the inner cylinder 53 are the same toward the downstream in the flowing direction of the exhaust gas. The end of the exhaust casing 27 placed at the outer peripheral side than the outer diffuser 42 of the exhaust diffuser 41, and the end of the outer casing 52 of the exhaust chamber 14 are connected by the exhaust chamber support 32.

The exhaust chamber support 32 extends in the axial direction of the turbine 13 in the form of a strip, and a plurality thereof is arranged side by side at predetermined intervals in the circumferential direction. If thermal expansion occurs due to the temperature difference between the exhaust casing 27 and the exhaust chamber 14, each of the exhaust chamber supports 32 absorbs the thermal expansion by deforming its shape. The thermal expansion tends to occur during a transition period such as at the start of the turbine 13 and during heavy load operation.

As shown in FIGS. 2 and 3, a connection ring 55 is fixed to the end of the exhaust casing 27 by a bolt 56. A connection flange 32a that is one of the ends of the exhaust chamber support 32 is fastened to this connection ring 55 by bolts 57, and a connection flange 32b that is the other end of the exhaust chamber support 32 is fastened to a mounting flange 52a of the outer casing 52 in the exhaust chamber 14 by bolts 58. A gas seal 59 is provided between the downstream end of the exhaust casing 27 and the downstream end of the outer diffuser 42. A gas seal 60 is provided between the connection ring 55 and the upstream end of the outer casing 52, at the inside of the exhaust chamber support 32. A rubber seal 61 is provided between the ends of the inner diffusers 43 and 53.

The gas seal 59 serves to confine the cool air supplied through the inside of the strut shield 44 to between the outer diffuser 41 and the exhaust casing 27.

An insulator 62 is mounted on the outer peripheral surface of the exhaust casing 27. Similarly, an insulator 63 is mounted on the outer peripheral surface of the exhaust chamber 14. The exhaust chamber supports 32 are provided outside the outer casing 52 of the exhaust chamber 14, and the exhaust chamber supports 32 are disposed outside the insulator 63. The exhaust chamber support 32 can be cooled by the outside air. The insulator 63 is disposed so as to avoid the opening of the follow strut 54 so as not to block the air intake.

The exhaust duct 31 shown in FIGS. 1 and 4 is formed in a cylindrical shape, and connected to the exhaust chamber 14 by the exhaust duct support 33 and the expansion joint 34. An outer shell member 71 formed in a ring shape is disposed at the outer peripheral side of the end of the exhaust chamber 14. The end of the exhaust chamber 14 and the inner periphery of the outer shell member 71 are connected by the exhaust duct support 33. The exhaust duct support 33 extends in the axial direction of the turbine 13 in the form of a strip, and a plurality thereof is arranged side by side at predetermined intervals in the circumferential direction. If thermal expansion occurs due to the temperature difference between the exhaust chamber 14 and the exhaust duct 31, each of the exhaust duct supports 33 absorbs the thermal expansion by deforming its shape. In particular, the thermal expansion tends to occur during a transition period such as at the start of the turbine 13 and during heavy load operation. The cross-section of the outer shell member 71 is formed in a U-shape opened to the outside, and the outer shell member 71 includes a mounting flange 71a at the inner peripheral surface and a connection flange 71b at the outer periphery.

A connection flange 33a that is one of the ends of the exhaust duct support 33 is fastened to the mounting flange 71a of the outer shell member 71 by bolts 72, and a connection flange 33b that is the other end of the exhaust duct support 33 is fastened to a connection flange 52b of the outer casing 52 of the exhaust chamber 14 by bolts 73. A gas seal 74 is provided between the mounting flange 71a of the outer shell member 71 and the outer casing 52, at the outside of the exhaust duct supports 33.

In the expansion joint 34, support flanges 77 and 78 are placed upright on a pair of mounting flanges 75 and 76 formed in a ring shape, and the mounting flanges 75 and 76 are bridged across and connected by a locking seal 79 formed in a ring shape. An insulator 80 is filled into a space formed by the support flanges 77 and 78, and the locking seal 79. The insulator 80 is covered by a boot 81. The ends of the boot 81 are fastened to the support flanges 77 and 78 by bolts 82 and 83. The mounting flange 75 is fastened to the connection flange 71b of the outer shell member 71 by a bolt 84, and the mounting flange 76 is fastened to the end of the exhaust duct 31 by a bolt 85. The expansion joint 34 insulates between the exhaust chamber 14 and the exhaust duct 31 during heavy load operation performed by the turbine 13, and if thermal expansion occurs due to the temperature difference, the expansion joint 34 absorbs the thermal expansion by deforming its shape.

Insulators 86 and 87 are mounted on the inner peripheral surface of the mounting flanges 75 and 76, and an insulator 88 is mounted on the inner peripheral surface of the exhaust duct 31. The expansion joint 34 is disposed outside the insulators 86, 87, and 88, and cooled by the outside air.

In this manner, in the connection structure of the exhaust chamber of the present embodiment, the exhaust chamber 14 and the exhaust casing 27 disposed upstream of the exhaust chamber 14 in the flowing direction of the exhaust gas, are connected by the exhaust chamber supports 32 that can absorb thermal expansion. The insulator 63 is mounted on the outer peripheral surface of the exhaust chamber 14, and the exhaust chamber supports 32 are disposed outside the insulator 63 in the form of strips. One of the ends of the exhaust chamber support 32 is connected to the end of the exhaust chamber 14, and the other end is connected to the end of the exhaust casing 27.

Accordingly, because the exhaust chamber supports 32 are formed in strips and can be deformed easily, the exhaust chamber supports 32 can effectively absorb the thermal expansion that occurs between the exhaust chamber 14 and the exhaust casing 27. Because the exhaust chamber supports 32 are disposed outside the insulator 63, the exhaust chamber supports 32 are sufficiently cooled by the outside air. As a result, the thermal stress at a connection portion between the exhaust chamber 14 and the exhaust casing 27, in other words, at the exhaust chamber support 32 is reduced, thereby enhancing the durability.

In this case, the gas seals 59 and 60 for connecting the exhaust chamber 14 and the exhaust casing 27 are provided inside the exhaust chamber supports 32. Accordingly, it is possible to prevent the exhaust gas from leaking from the connection portion between the exhaust chamber 14 and the exhaust casing 27 to the outside. Because the exhaust chamber supports 32 and the exhaust casing 27 are separated from high-temperature exhaust gas, the thermal expansions thereof can be prevented.

In the connection structure of the exhaust chamber of the present embodiment, the exhaust diffuser 41 formed in a cylindrical shape is disposed inside the exhaust casing 27, and the exhaust casing 27 and the exhaust diffuser 41 are connected by the diffuser supports 48 that can absorb thermal expansion in the form of strips. Accordingly, the thermal expansion that occurs due to the temperature difference between the exhaust casing 27 and the exhaust diffuser 41 can be effectively absorbed, thereby enhancing the durability.

In the connection structure of the exhaust chamber of the present embodiment, the exhaust chamber 14 and the exhaust duct 31 disposed downstream of the exhaust chamber 14 in the flowing direction of the exhaust gas, are connected by the exhaust duct supports 33 that can absorb thermal expansion. The insulator 63 is mounted on the outer peripheral surface of the exhaust chamber 14, and the exhaust duct supports 33 are disposed outside the insulator 63 in the form of strips. One of the ends of the exhaust duct support 33 is connected to the end of the exhaust chamber 14, and the other end is connected to the end of the exhaust duct 31.

Accordingly, because the exhaust duct supports 33 are formed in strips and can be deformed easily, the thermal expansion that occurs between the exhaust chamber 14 and the exhaust duct 31 can be effectively absorbed. Because the expansion joint 34 is disposed outside the exhaust duct supports 33, the expansion joint 34 is sufficiently cooled by the outside air. The expansion joint 34 is protected from heat by the exhaust duct supports 33 provided inside.

In this case, because the gas seal 74 for connecting the exhaust chamber 14 and the exhaust duct 31 is provided outside the exhaust duct supports 33, it is possible to prevent the exhaust gas from leaking from the connection portion between the exhaust chamber 14 and the exhaust duct 31 to the outside.

In the connection structure of the exhaust chamber according to the present embodiment, the outer shell member 71 formed in a ring shape is disposed at the outer peripheral side of the exhaust chamber 14, and the exhaust duct 31 is disposed adjacent to the outer shell member 71. The exhaust chamber 14 and the outer shell member 71 are connected by the exhaust duct supports 33, and the outer shell member 71 and the exhaust duct 31 are connected by the expansion joint 34. Accordingly, the expansion joint 34 can be sufficiently cooled, thereby enhancing the durability.

In this case, because the insulator 88 is mounted on the inner peripheral surface of the exhaust duct 31, the temperature of the inner surface is maintained. Accordingly, the temperature of the exhaust duct 31 can be reduced, and the temperature of the expansion joint 34 can be prevented from being increased, thereby enhancing the durability.

The gas turbine of the present embodiment includes the compressor 11, the combustor 12, and the turbine 13. The exhaust casing 27 of the turbine 13 and the exhaust chamber 14 are connected by the exhaust chamber supports 32, and the exhaust chamber 14 and the exhaust duct 31 are connected by the exhaust duct supports 33. The insulator 63 is mounted on the outer peripheral surface of the exhaust chamber 14, and the exhaust chamber supports 32 and the exhaust duct supports 33 are disposed outside the insulator 63 in the form of strips.

Accordingly, because the exhaust chamber supports 32 and the exhaust duct supports 33 are formed in strips and can be deformed easily, the thermal expansions that occur between the exhaust casing 27, the exhaust chamber 14, and the exhaust duct 31 can be effectively absorbed. Because the exhaust chamber supports 32 and the exhaust duct supports 33 are disposed outside the insulator 63, the supports 32 and 33 are sufficiently cooled by the outside air. As a result, the thermal stresses at the connection portions of the exhaust casing 27, the exhaust chamber 14, and the exhaust duct 31, in other words, at the supports 32 and 33 are reduced, thereby enhancing the durability. Consequently, the power and efficiency of the turbine can be enhanced.

Second Embodiment

Figure 6:
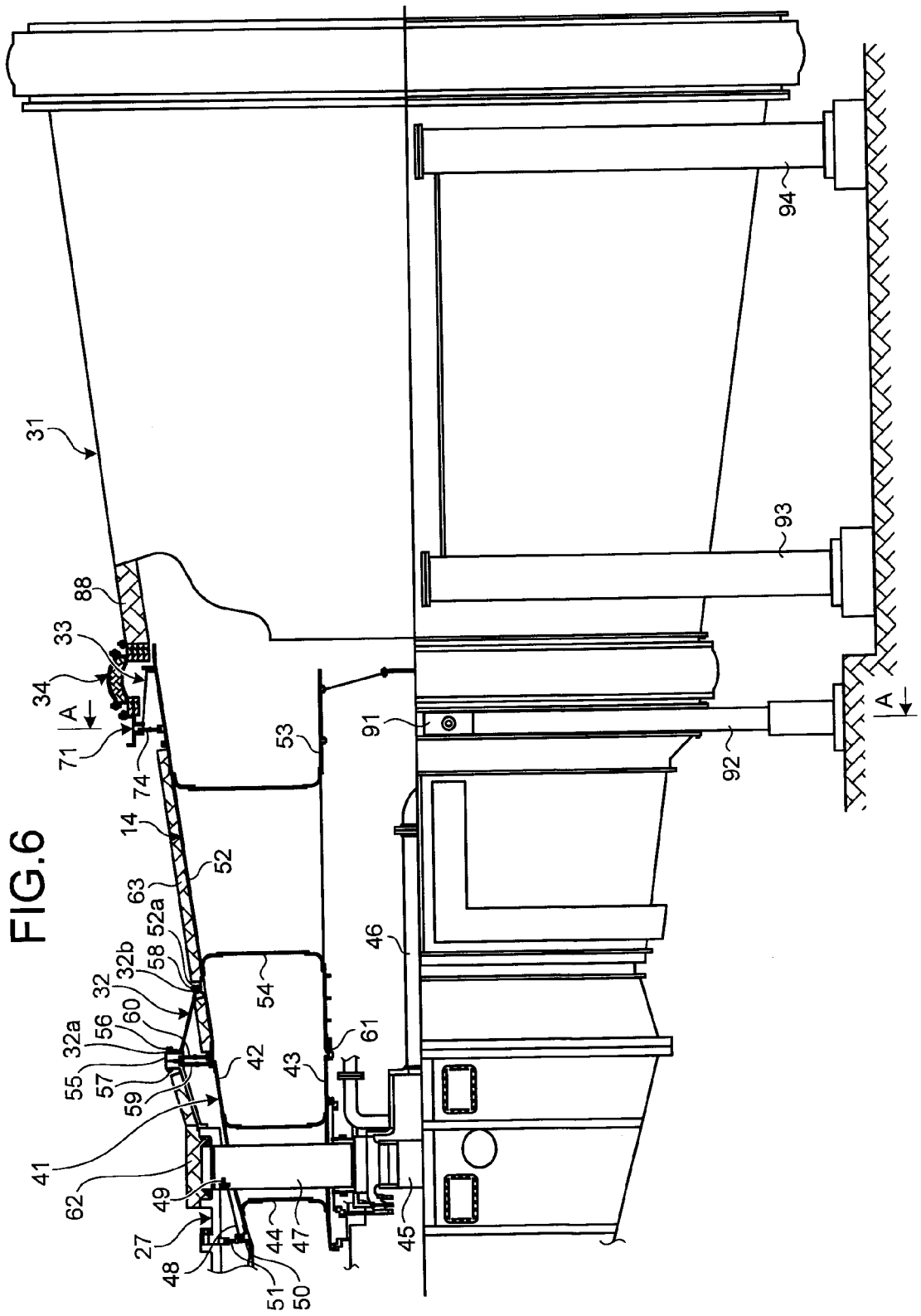
FIG. 6 is a sectional view of an essential portion of a turbine illustrating a support structure of a turbine in a gas turbine according to a second embodiment of the present invention.
Figure 7:
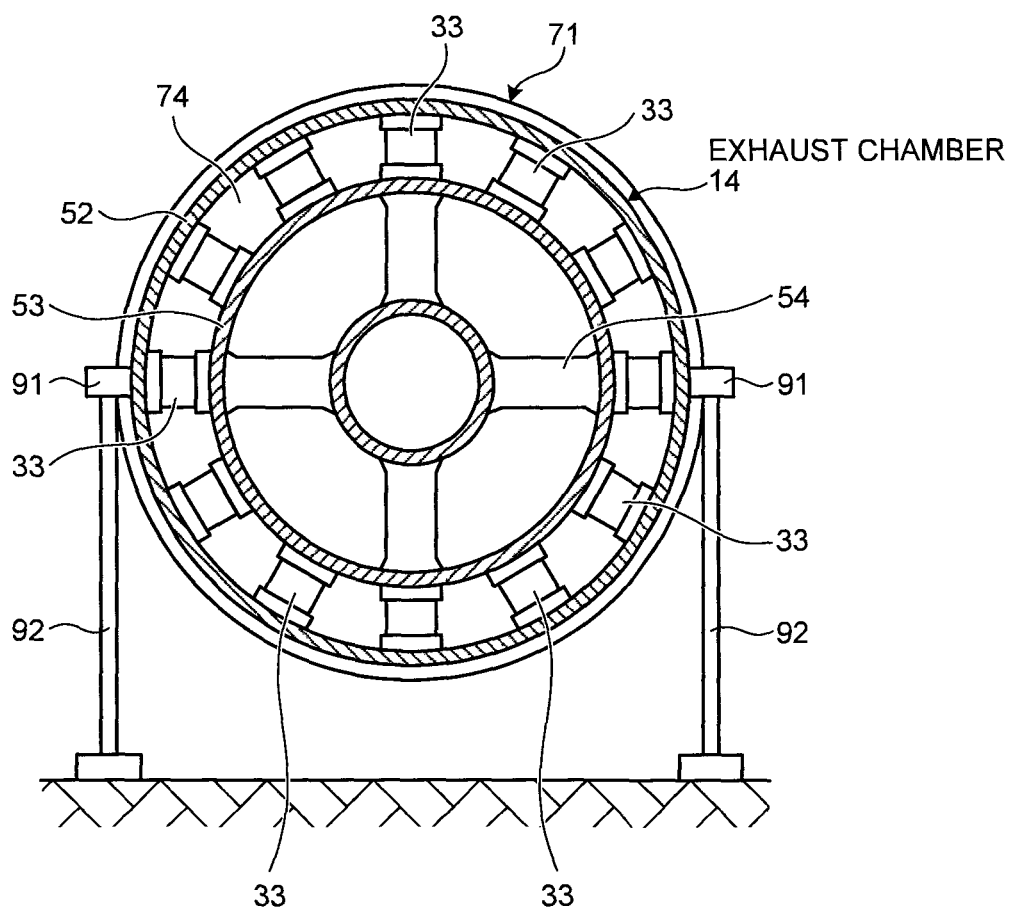
FIG. 7 is a sectional view taken along the line A-A in FIG. 1 illustrating the support structure of the turbine of the second embodiment.
Figure 8:
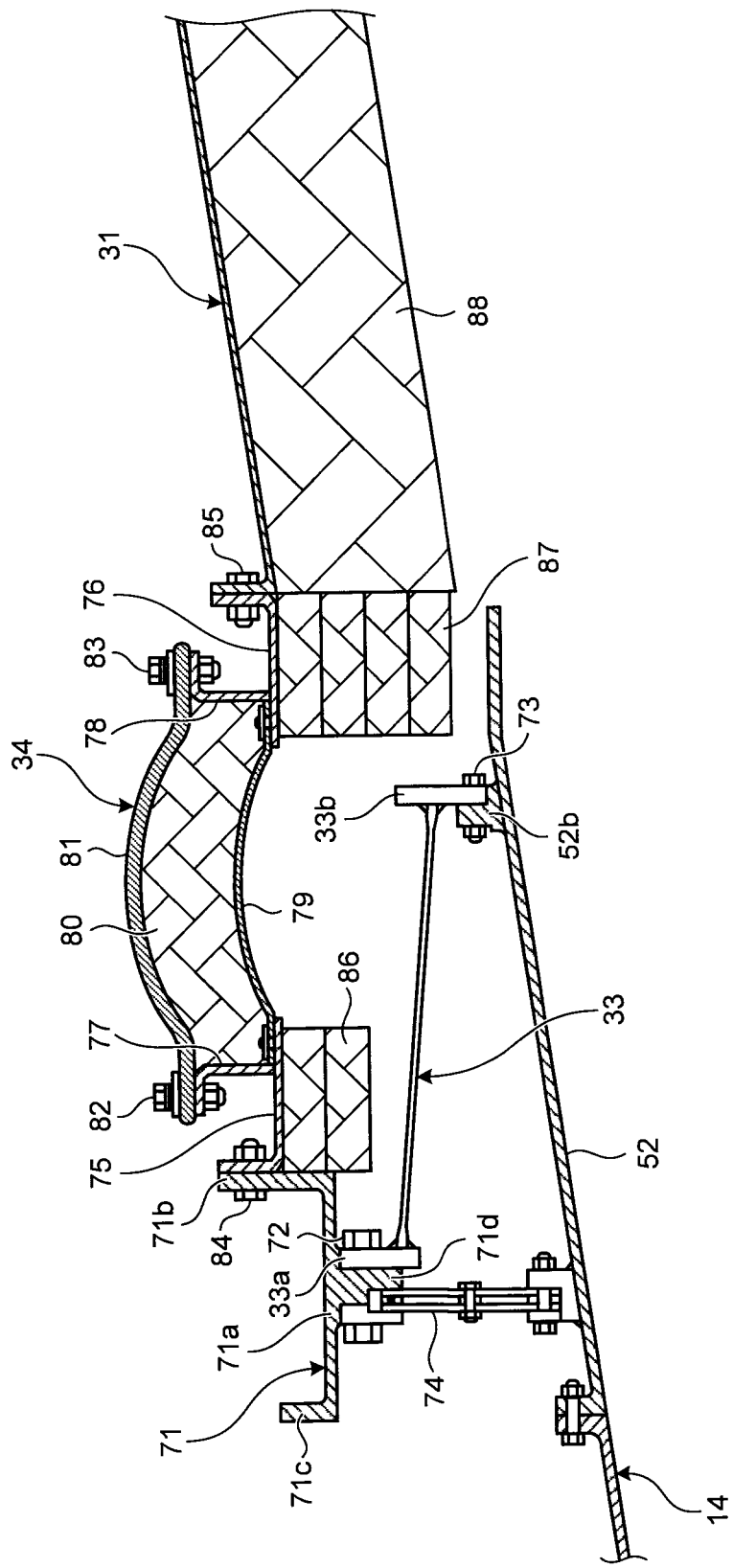
FIG. 8 is a sectional view of a connection portion between an exhaust chamber and an exhaust duct in the gas turbine of the second embodiment.
Figure 9:
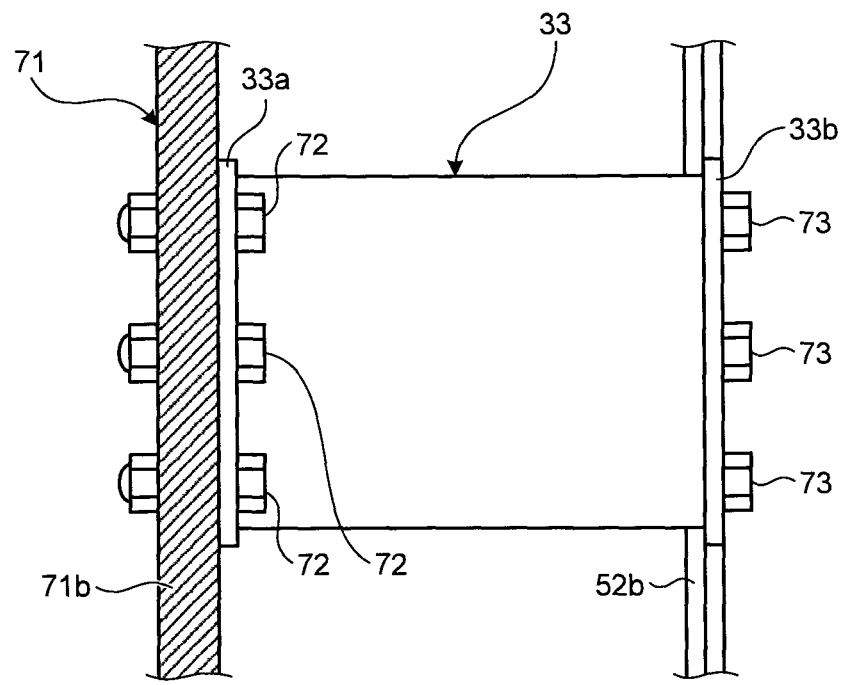
FIG. 9 is a plan view of the connection portion between the exhaust chamber and the exhaust duct.
Figure 10:
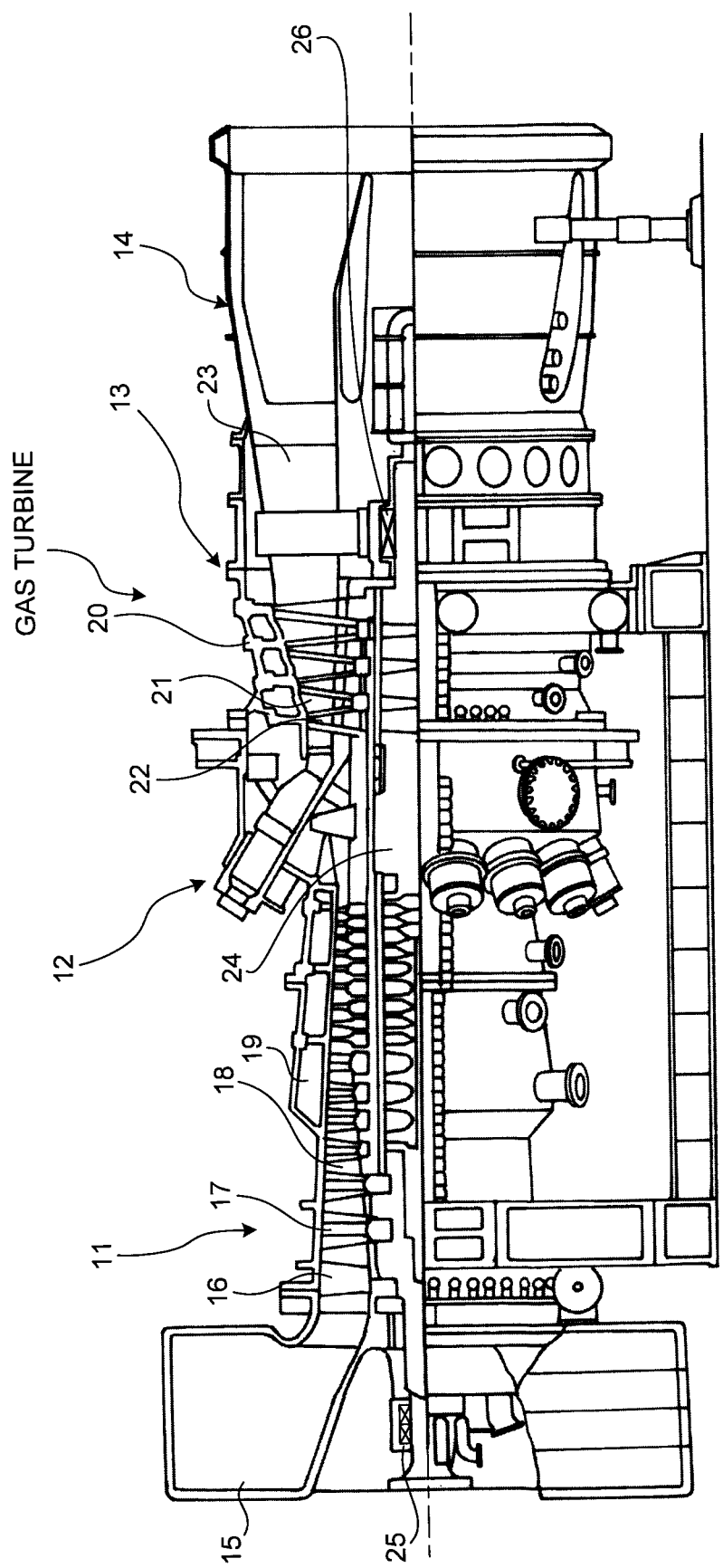
FIG. 10 is a schematic of the gas turbine of the second embodiment.

FIG. 6 is a sectional view of an essential portion of a turbine illustrating a support structure of a turbine in a gas turbine according to a second embodiment of the present invention. FIG. 7 is a sectional view taken along the line A-A in FIG. 6 illustrating the support structure of the turbine of the second embodiment. FIG. 8 is a sectional view of a connection portion between an exhaust chamber and an exhaust duct in the gas turbine of the second embodiment. FIG. 9 is a plan view of the connection portion between the exhaust chamber and the exhaust duct. FIG. 10 is a schematic of the gas turbine of the second embodiment The gas turbine of the present embodiment, as shown in FIG. 10, includes the compressor 11, the combustor 12, the turbine 13, and the exhaust chamber 14. A generator, which is not shown, is connected to this gas turbine 13. This compressor 11 includes the air inlet port 15 for taking in air, the compressor casing 16 in which the nozzles 17 and the rotor blades 18 are alternately arranged, and the bleed air manifold 19 provided at the outside. The combustor 12 supplies fuel to compressed air compressed by the compressor 11, and the compressed air and fuel are burned by being ignited by a burner. The turbine 13 includes the turbine casing 20 in which the nozzles 21 and the rotor blades 22 are alternately arranged. The exhaust chamber 14 is disposed downstream of the turbine casing 20 interposing the exhaust casing 27 therebetween. The exhaust chamber 14 includes the exhaust diffuser 23 continued to the turbine 13. The rotor (turbine shaft) 24 is placed so as to penetrate through the center portions of the compressor 11, the combustor 12, the turbine 13, and the exhaust chamber 14. The end of the rotor 24 at the side of the compressor 11 is rotatably supported by the bearing portion 25, and the end of the rotor 24 at the side of the exhaust chamber 14 is rotatably supported by the bearing portion 26. The rotor 24 is formed of the disks on which the rotor blades 18 and 22 are placed, and a driving shaft of the generator, which is not shown, is connected to the end at the side of the exhaust chamber 14.

Accordingly, the air taken in from the air inlet port 15 of the compressor 11 is turned into high-temperature and high-pressure compressed air, by passing through the nozzles 17 and the rotor blades 18, and being compressed. In the combustor 12, a predetermined fuel is supplied to the compressed air to be combusted. The high-temperature and high-pressure combustion gas that is working fluid produced in the combustor 12 passes through the nozzles 21 and the rotor blades 22 of the turbine 13, thereby rotatably driving the rotor 24 and driving the generator connected to the rotor 24. The exhaust gas is converted into static pressure by the exhaust diffuser 23 in the exhaust chamber 14 and then released to the atmosphere.

In the turbine 13 described above, as shown in FIGS. 6 and 7, the exhaust casing 27 is placed downstream of the turbine casing 20 in which the nozzles 21 and the rotor blades 22 (see FIG. 10) are alternately arranged. The exhaust casing 27 is formed in a cylindrical shape. The exhaust chamber 14 is disposed downstream of the exhaust casing 27 in the flowing direction of the exhaust gas. The exhaust chamber 14 is formed in a cylindrical shape. The exhaust duct 31 is disposed downstream of the exhaust chamber 14 in the flowing direction of the exhaust gas. The exhaust duct 31 is formed in a cylindrical shape. The exhaust casing 27 and the exhaust chamber 14 are connected by the exhaust chamber support 32 that can absorb thermal expansion. The exhaust chamber 14 and the exhaust duct 31 are connected by the exhaust duct support (support member) 33 that can absorb thermal expansion and the expansion joint (high-temperature expansion joint) 34 that can absorb thermal expansion.

In this case, in the present embodiment, the outer shell member 71 formed in a ring shape is disposed downstream of the end of the exhaust chamber 14 as a turbine main body in the flowing direction of the exhaust gas, at the outer peripheral side. The exhaust chamber 14 and the outer shell member 71 are connected by the exhaust duct support 33, and the outer shell member 71 and the exhaust duct 31 are connected by the expansion joint 34. Exhaust chamber legs 92 for mounting the exhaust chamber 14 are connected to the outer shell member 71.

The exhaust diffuser 41 formed in a cylindrical shape is disposed inside the exhaust casing 27. The exhaust diffuser 41 includes the outer diffuser 42 and the inner diffuser 43 formed in cylindrical shapes connected by the strut shield 44. The strut shield 44 has a hollow shape such as a cylindrical shape or an elliptic cylindrical shape, and is provided in plurality at equal intervals in the circumferential direction of the exhaust diffuser 41. At the inner periphery of the inner diffuser 43, the rotor 24 is rotatably supported through the bearing 45, and the oil pipe 46 for supplying lubricating oil to the bearing 45 is disposed. The strut 47 is disposed in each of the strut shields 44. Cool air is supplied to a space inside the exhaust diffuser 41 and a space between the exhaust casing 27 and the exhaust diffuser 41 from outside, through the space inside the strut shield 44. The diffuser support 48, which will be described later, is also cooled by this cool air. One of the ends of the strut 44 is fixed to the exhaust casing 27, and the other end is fixed to a bearing box.

The exhaust casing 27 and the exhaust diffuser 41 are connected by the diffuser support 48. The diffuser support 48 extends in the axial direction of the turbine 13 in the form of a strip, and a plurality thereof is arranged side by side at predetermined intervals in the circumferential direction. If thermal expansion occurs due to the temperature difference between the exhaust casing 27 and the exhaust diffuser 41, each of the diffuser supports 48 absorbs the thermal expansion by deforming its shape. In particular, the thermal expansion tends to occur during a transition period such as at the start of the turbine 13. One of the ends of the diffuser support 48 is fastened to the exhaust casing 27 by the bolt 49, and the other end is fastened to the outer diffuser 42 by the bolt 50. The exhaust casing 27 is provided so as to cover the diffuser supports 48 from outside. The gas seal 51 is provided between the outer diffuser 42 and the exhaust casing 27, thereby shielding the exhaust casing 27 from the turbine casing 20.

The exhaust chamber 14 includes the outer casing 52 and the inner cylinder 53 formed in cylindrical shapes connected by the follow strut 54. The follow strut 54 has a hollow shape such as a cylindrical shape or an elliptic cylindrical shape, and is provided in plurality at equal intervals in the circumferential direction of the exhaust chamber 14. Each of the follow struts 54 is opened at the side of the outer casing 52 of the exhaust chamber 14, and the inside of the follow strut 54 communicates with the atmosphere.

The exhaust casing 27 and the exhaust chamber 14 are connected by the exhaust chamber support 32. In the exhaust diffuser 41 and the exhaust chamber 14, the ends of the outer diffuser 42 and the outer casing 52, and the inner diffuser 43 and the inner cylinder 53 are closely facing each other. The diameters of the outer diffuser 42 and the outer casing 52 are enlarged toward the downstream in the flowing direction of the exhaust gas. However, the diameters of the inner diffuser 43 and the inner cylinder 53 are the same toward the downstream in the flowing direction of the exhaust gas. The end of the exhaust casing 27 placed at the outer peripheral side than the outer diffuser 42 of the exhaust diffuser 41 and the end of the outer casing 52 of the exhaust chamber 14 are connected by the exhaust chamber support 32.

The exhaust chamber support 32 extends in the axial direction of the turbine 13 in the form of a strip, and a plurality thereof is arranged side by side at predetermined intervals in the circumferential direction. If thermal expansion occurs due to the temperature difference between the exhaust casing 27 and the exhaust chamber 14, each of the exhaust chamber supports 32 absorbs the thermal expansion by deforming its shape. The thermal expansion tends to occur during a transition period such as at the start of the turbine 13 and during heavy load operation.

The connection ring 55 is fixed to the end of the exhaust casing 27 by the bolt 56. The connection flange 32a that is one of the ends of the exhaust chamber support 32 is fastened to the connection ring 55 by the bolts 57, and the connection flange 32b that is the other end of the exhaust chamber support 32 is fastened to the mounting flange 52a of the outer casing 52 in the exhaust chamber 14 by the bolts 58. The gas seal 59 is provided between the downstream end of the exhaust casing 27 and the downstream end of the outer diffuser 42. The gas seal 60 is placed inside the exhaust chamber supports 32 between the connection ring 55 and the upstream end of the outer casing 52. The rubber seal 61 is provided between the ends of the inner diffuser 43 and the inner cylinder 53.

The gas seal 59 serves to confine the cool air supplied through the inside of the strut shield 44 to between the outer diffuser 41 and the exhaust casing 27.

The insulator 62 is mounted on the outer peripheral surface of the exhaust casing 27. Similarly, the insulator 62 is mounted on the outer peripheral surface of the exhaust chamber 14. The exhaust chamber supports 32 are provided outside the outer casing 52 of the exhaust chamber 14, and the exhaust chamber supports 32 are disposed outside this insulator 63. The exhaust chamber supports 32 can be cooled by the outside air. The insulator 63 is disposed so as to avoid the opening of the follow strut 54, so as not to block the air intake.

The exhaust duct 31 shown in FIGS. 6 to 10 is formed in a cylindrical shape, and connected to the exhaust chamber 14 by the exhaust duct support 33 and the expansion joint 34. The outer shell member 71 formed in a ring shape is disposed at the outer peripheral side of the end of the exhaust chamber 14. The end of the exhaust chamber 14 and the inner periphery of the outer shell member 71 are connected by the exhaust duct support 33. The exhaust duct support 33 extends in the axial direction of the turbine 13 in the form of a strip, and a plurality thereof is arranged side by side at predetermined intervals in the circumferential direction. If thermal expansion occurs due to the temperature difference between the exhaust chamber 14 and the exhaust duct 31, each of the exhaust duct supports 33 absorbs the thermal expansion by deforming its shape. In particular, the thermal expansion tends to occur during a transition period such as at the start of the turbine 13 and during heavy load operation. The cross section of the outer shell member 71 is formed in a U-shape opened to the outside. The outer shell member 71 includes an outer shell main body 71a substantially parallel to the outer peripheral surface of the exhaust chamber 14, the connection flanges 71b and 71c that stand upright from both sides of the outer shell main body 71a substantially perpendicular to the outer peripheral surface of the exhaust chamber 14, and a connection flange 71d projected to the outer peripheral surface side of the exhaust chamber 14 from the outer shell main body 71a.

The connection flange 33a that is one of the ends of the exhaust duct support 33 is fastened to the mounting flange 71d of the outer shell member 71 by the bolts 72. The connection flange 33b that is the other end of the exhaust duct support 33 is fastened to the connection flange 52b of the outer casing 52 of the exhaust chamber 14 by the bolts 73. The gas seal 74 is provided between the mounting flange 71b of the outer shell member 71 and the outer casing 52, at the outside of the exhaust duct supports 33.

At the expansion joint 34, the support flanges 77 and 78 are placed upright on the pair of mounting flanges 75 and 76 formed in a ring shape, and the mounting flanges 75 and 76 are bridged across and connected by the locking seal 79 formed in a ring shape. The insulator 80 is filled into a space formed by the support flanges 77 and 78, and the locking seal 79. The insulator 80 is covered by the boot 81. The ends of the boot 81 are fastened to the support flanges 77 and 78 by the bolts 82 and 83. The mounting flange 75 is fastened to the connection flange 71b of the outer shell member 71 by the bolt 84, and the mounting flange 76 is fastened to the end of the exhaust duct 31 by the bolt 85. The expansion joint 34 insulates between the exhaust chamber 14 and the exhaust duct 31 during heavy load operation performed by the turbine 13, and if thermal expansion occurs due to the temperature difference, the expansion joint 34 absorbs the thermal expansion by deforming its shape.

The insulators 86 and 87 are mounted on the inner peripheral surfaces of the mounting flanges 75 and 76, and the insulator 88 is mounted on the inner peripheral surface of the exhaust duct 31. The expansion joint 34 is disposed outside the insulators 86, 87, and 88, and cooled by the outside air.

As shown in FIGS. 6 and 7, in the outer shell member 71 connected to the exhaust chamber 14 interposing the exhaust duct supports 33 in the form of strips therebetween, mounting brackets 91 are fixed to both sides of the outer shell main body 71a, and exhaust chamber legs 92 are connected to the mounting brackets 91. Accordingly, the exhaust chamber 14 is mounted on the floor of a turbine building, which is not shown, by the two exhaust chamber legs 92. In other words, the exhaust chamber 14 is supported by the outer shell member 71 interposing the exhaust duct supports 33 arranged side by side in the circumferential direction therebetween, and the outer shell member 71 is mounted on the floor by the exhaust chamber legs 92.

In this case, the exhaust duct supports 33 are formed in strips having a predetermined width, and mounted in the longitudinal direction (flowing direction of exhaust gas) of the exhaust chamber 14. Because the exhaust duct supports 33 are arranged side by side in the circumferential direction of the exhaust chamber 14, each of the exhaust duct supports 33 has a high rigidity in the vertical (circumferential) direction. Because the cross-section of the outer shell member 71 is irregular in which the connection flange 71d is added to the U-shaped cross section of the outer shell main body 71a and the connection flanges 71b and 71c, the outer shell member 71 has a high rigidity in the vertical (circumferential) direction. Accordingly, the exhaust duct supports 33 and the outer shell member 71 have high rigidities, thereby sufficiently supporting the weight of the exhaust chamber 14. Due to the deformation of the exhaust duct supports 33, the thermal expansion of the exhaust chamber 14 can be sufficiently absorbed.

As shown in FIG. 6, the exhaust duct 31 is mounted on the floor of the building by a plurality of exhaust duct legs 93 and 94. The exhaust casing 27 is mounted on the floor of the building by exhaust casing legs, which are not shown.

In this manner, in the support structure of the turbine of the present embodiment, the outer shell member 71 formed in a ring shape is disposed at the outer peripheral side of the exhaust chamber 14, as the turbine main body formed in a cylindrical shape. The exhaust chamber 14 and the outer shell member 71 are connected by the exhaust duct supports 33 that can absorb thermal expansion, and the exhaust chamber legs 92 for mounting the exhaust chamber 14 in the building are connected to the outer shell member 71.

Accordingly, because the outer shell member 71 and the exhaust duct supports 33 have high rigidities, the bending stress due to the weight of the exhaust chamber 14 can be sufficiently supported, and the thermal expansion of the exhaust chamber 14 can be absorbed by the exhaust duct supports 33. Consequently, the bending stress and the thermal stress applied to the exhaust chamber 14 are reduced, thereby enhancing the durability.

In the support structure of the turbine of the present embodiment, the expansion joint 34 is interposed between the outer shell member 71 and the exhaust duct 31. Accordingly, the thermal expansion between the exhaust chamber 14 and the exhaust duct 31 can be effectively absorbed by the expansion joint 34, thereby enhancing the durability.

In the support structure of the turbine of the present embodiment, the exhaust duct supports 33 are formed in strips, and one of the ends of the exhaust duct support 33 is connected to the end of the exhaust chamber 14, and the other end is connected to the end of the outer shell member 71. Because the exhaust duct supports 33 are formed in strips and have high rigidities, the exhaust duct supports 33 can suitably support the bending stress due to the weight of the exhaust chamber 14.

In the support structure of the turbine of the present embodiment, the gas seal 74 for connecting the exhaust chamber 14 and the outer shell member 71 is provided outside the exhaust duct supports 33. Accordingly, it is possible to prevent the exhaust gas from leaking from the connection portion between the exhaust chamber 14 and the exhaust duct 31.

The gas turbine of the present embodiment includes the compressor 11, the combustor 12, and the turbine 13. The exhaust chamber 14 of the turbine 13 and the outer shell member 71 formed in a ring shape disposed at the outer peripheral side of the exhaust chamber 14 are connected by the exhaust duct supports 33 that can absorb thermal expansion. The outer shell member 71 and the exhaust duct 31 are connected interposing the expansion joint 34 therebetween, and the exhaust chamber legs 92 for mounting the exhaust chamber 14 are connected to the outer shell member 71.

Accordingly, because the outer shell member 71 and the exhaust duct supports 33 have high rigidities, the bending stress due to the weight of the exhaust chamber 14 can be sufficiently supported, and the thermal expansion of the exhaust chamber 14 can be absorbed by the exhaust duct supports 33. Consequently, the bending stress and the thermal stress applied to the exhaust chamber 14 are reduced, thereby enhancing the durability of the entire gas turbine.

Third Embodiment

Figure 11:
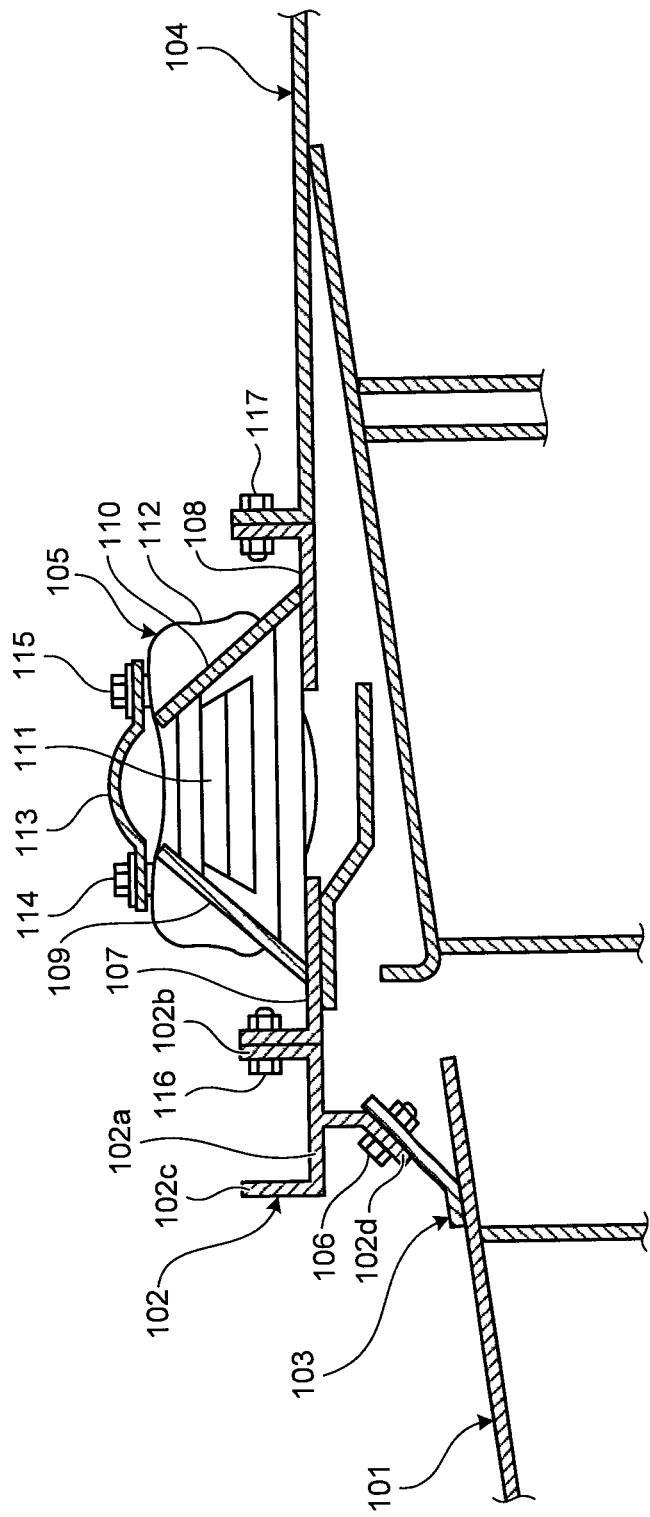
FIG. 11 is a sectional view of an essential portion of a turbine illustrating a support structure of a turbine in a gas turbine according to a third embodiment of the present invention.

FIG. 11 is a sectional view of an essential portion of a turbine illustrating a support structure of a turbine in a gas turbine according to a third embodiment of the present invention.

In the support structure of the turbine in the gas turbine of the present embodiment, as shown in FIG. 11, an exhaust chamber 101 as a turbine main body is formed in a cylindrical shape. An outer shell member 102 formed in a ring shape is disposed downstream of the end of the exhaust chamber 101 in the flowing direction of the exhaust gas, at the outer peripheral side, and the exhaust chamber 101 and the outer shell member 102 are connected by an exhaust duct support (support member) 103. An exhaust duct 104 is disposed downstream of the exhaust chamber 101 in the flowing direction of the exhaust gas. The exhaust duct 104 is formed in a cylindrical shape, and the outer shell member 102 and the exhaust duct 104 are connected by an expansion joint (high-temperature expansion joint) 105. Exhaust chamber legs, which are not shown, for mounting the exhaust chamber 101 are connected to the outer shell member 102.

In other words, the outer shell member 102 formed in a ring shape is disposed at the outer peripheral side of the end of the exhaust chamber 101. The end of the exhaust chamber 101 and the inner periphery of the outer shell member 102 are connected by the exhaust duct support 103. The exhaust duct support 103 is formed in a truncated cone shape. If thermal expansion occurs due to the temperature difference between the exhaust chamber 101 and the exhaust duct 104, the exhaust duct support 103 absorbs the thermal expansion by deforming its shape. In particular, the thermal expansion tends to occur during a transition period such as at the start of the turbine and during heavy load operation. The cross-section of the outer shell member 102 is formed in a U-shape opened to the outside. The outer shell member 102 includes an outer shell main body 102a substantially parallel to the outer peripheral surface of the exhaust chamber 101, connection flanges 102b and 102c that stand upright from both sides of the outer shell main body 102a substantially perpendicular to the outer peripheral surface of the exhaust chamber 101, and a connection flange 102d projected to the outer peripheral surface side of the exhaust chamber 101 from the outer shell main body 102a. One of the ends of the exhaust duct support 103 is fastened to the mounting flange 102d of the outer shell member 102 by a bolt 106, and the other end is fixed to the exhaust chamber 101.

In the expansion joint 105, support flanges 109 and 110 are placed upright on a pair of mounting flanges 107 and 108 formed in a ring shape. An insulator 111 is filled into a space formed by the support flanges 109 and 110, and covered by a bellows 112. A cover 113 is fastened by bolts 114 and 115. The mounting flange 107 is fastened to the connection flange 102b of the outer shell member 102 by a bolt 116, and the mounting flange 108 is fastened to the end of the exhaust duct 104 by a bolt 117. This expansion joint 105 insulates between the exhaust chamber 101 and the exhaust duct 104 during heavy load operation performed by the turbine, and if thermal expansion occurs due to the temperature difference, the expansion joint 105 absorbs the thermal expansion by deforming its shape.

Although not shown, the exhaust chamber legs are connected to both sides of the outer shell member 102 interposing mounting brackets therebetween. Accordingly, the exhaust chamber 101 is mounted on the floor of the turbine building by two exhaust chamber legs. In other words, the exhaust chamber 101 is supported by the outer shell member 102 interposing the exhaust duct support 103 therebetween, and the outer shell member 102 is mounted on the floor by the exhaust chamber legs.

In this case, because the exhaust duct support 103 is formed in a truncated cone shape, and mounted in the longitudinal direction (flowing direction of exhaust gas) of the exhaust chamber 101, the exhaust duct support 103 has a high rigidity in the vertical (circumferential) direction. Because the cross-section of the outer shell member 102 is irregular in which the connection flange 102d is added to the U-shaped cross section of the outer shell main body 102a and the connection flanges 102b and 102c, the outer shell member 102 has a high rigidity in the vertical (circumferential) direction. Accordingly, the exhaust duct support 103 and the outer shell member 102 have high rigidities, thereby sufficiently supporting the weight of the exhaust chamber 101. Due to the deformation of the exhaust duct support 103, the thermal expansion of the exhaust chamber 101 can also be sufficiently absorbed.

In this manner, in the support structure of the turbine of the present embodiment, the outer shell member 102 formed in a ring shape is disposed at the outer peripheral side of the exhaust chamber 101 as a turbine main body formed in a cylindrical shape. The exhaust chamber 101 and the outer shell member 102 are connected by the exhaust duct support 103 that can absorb thermal expansion, and the exhaust chamber legs for mounting the exhaust chamber 101 in the building are connected to the outer shell member 102.

Accordingly, because the outer shell member 102 and the exhaust duct support 103 have high rigidities, the bending stress due to the weight of the exhaust chamber 101 can be sufficiently supported, and the thermal expansion of the exhaust chamber 101 can be absorbed by the exhaust duct support 103. Consequently, the bending stress and the thermal stress applied to the exhaust chamber 101 are reduced, thereby enhancing the durability.

In the support structure of the turbine of the present embodiment, the exhaust duct support 103 is formed in a truncated cone shape. One of the ends of the exhaust duct support 103 in the axial direction is connected to the end of the exhaust chamber 101, and the other end is connected to the end of the outer shell member 102. Being formed into a truncated cone shape, the exhaust duct support 103 has a high rigidity. Accordingly, the exhaust duct support 103 can suitably support the bending stress due to the weight of the exhaust chamber 101.

In the embodiments described above, the turbine main body of the present invention is the exhaust chamber 14. The exhaust chamber 14 and the outer shell member 71 are connected by the exhaust duct supports 33, and the exhaust chamber legs 92 are connected to the outer shell member 71. However, the present embodiment is not limited to this structure. In other words, the turbine main body of the present invention may be the exhaust casing 27, and an outer shell member may be provided outside this exhaust chamber 14 interposing a support member therebetween, and exhaust casing legs may be connected to this outer shell member. Alternatively, the turbine main body of the present invention may be the exhaust duct 31, and an outer shell member may be provided outside this exhaust duct 31 interposing a support member therebetween, and the exhaust duct legs may be connected to the outer shell member.

INDUSTRIAL APPLICABILITY

In the connection structure of the exhaust chamber and the gas turbine according to the present invention, the insulator is mounted on the outer peripheral surface of the exhaust chamber, and the support members are disposed outside the insulator in the form of strips. Because the thermal stress at the connection portion of the exhaust chamber is reduced, the durability is enhanced. As a result, the connection structure of the exhaust chamber and the gas turbine can be applied to any type of gas turbine.

In the support structure of the turbine and the gas turbine according to the present invention, the legs are connected to the outer shell member of the turbine main body interposing the support member that can absorb thermal expansion therebetween. Because the bending stress and the thermal stress applied to the turbine main body are reduced, the durability is enhanced. As a result, the support structure of the turbine and the gas turbine can be applied to any type of gas turbine.

The invention claimed is:
1. A support structure of a turbine comprising:
a turbine main body formed in a cylindrical shape, forming an exhaust system, and including an exhaust chamber and an exhaust duct;

an outer shell member formed in a ring shape and disposed at an outer peripheral side of the exhaust chamber; and an exhaust chamber leg for mounting the turbine main body, wherein the exhaust chamber leg connects between the outer shell member and a floor of a turbine building, wherein the exhaust chamber is disposed upstream of the exhaust duct, the exhaust chamber and the outer shell member are connected by a support member that is configured to absorb thermal expansion, and the outer shell member and the exhaust duct are connected by a high-temperature expansion joint that is configured to absorb thermal expansion.

2. The support structure of the turbine according to claim 1, wherein the support member is in a form of a plurality of strips, each having one end connected to a downstream side of the exhaust chamber in a flow direction of an exhaust gas, and another end connected to an inner periphery of the outer shell member.

3. The support structure of the turbine according to claim 1, further comprising:

a gas seal that connects the exhaust chamber to the outer shell member, and is disposed outside a connection portion between the support member and the exhaust chamber, and outside a connection portion between the support member and the outer shell member.

4. The support structure of the turbine according to claim 1, wherein the support member is formed in a truncated cone shape, one end of the support member in an axial direction is connected to a downstream side of the exhaust chamber in a flow direction of an exhaust gas, and another end of the support member is connected to an inner periphery of the outer shell member.

5. The support of the turbine according to claim 1, wherein the outer shell member is disposed downstream of an end of the exhaust chamber in a flow direction of an exhaust gas.

* * * * *